(12) United States Patent
Guldenfels et al.

(10) Patent No.: US 7,080,729 B2
(45) Date of Patent: Jul. 25, 2006

(54) BELT MODULE WITH OBLONG PIVOT HOLE

(75) Inventors: Dieter Guldenfels, Pfeffingen (CH); Markus Bernhard Vetter, Schliengen (DE)

(73) Assignee: Habasit AG (CH)

( * ) Notice: Subject to any disclaimer, the term of this patent is extended or adjusted under 35 U.S.C. 154(b) by 0 days.

(21) Appl. No.: 10/925,463

(22) Filed: Aug. 25, 2004

(65) Prior Publication Data

US 2006/0054469 A1    Mar. 16, 2006

(51) Int. Cl.
    *B65G 17/06*    (2006.01)
(52) U.S. Cl. .................. 198/844.1; 198/850; 198/851; 198/852; 198/853
(58) Field of Classification Search ............. 198/844.1, 198/850, 851, 852, 853
See application file for complete search history.

(56) References Cited

U.S. PATENT DOCUMENTS

| | | | | |
|---|---|---|---|---|
| 1,608,340 A | * | 11/1926 | Scheidy | 198/853 |
| 2,359,745 A | * | 10/1944 | Butler | 198/853 |
| 2,385,923 A | * | 10/1945 | Klaucke et al. | 198/834 |
| 3,066,549 A | * | 12/1962 | Benjamin | 198/853 |
| 3,268,064 A | * | 8/1966 | Pricenski | 198/851 |
| 3,804,232 A | | 4/1974 | Freiwald et al. | |
| 4,909,380 A | | 3/1990 | Hodlewsky | |
| 4,972,942 A | * | 11/1990 | Faulkner | 198/853 |
| 5,083,659 A | * | 1/1992 | Bode et al. | 198/853 |
| 5,105,938 A | * | 4/1992 | Tan | 198/853 |
| 5,125,504 A | * | 6/1992 | Corlett et al. | 198/850 |
| 5,217,110 A | * | 6/1993 | Spangler et al. | 198/852 |
| 5,507,383 A | * | 4/1996 | Lapyere et al. | 198/853 |
| 5,562,200 A | * | 10/1996 | Daringer | 198/844.2 |
| 6,305,530 B1 | | 10/2001 | Guldenfels | |
| 6,364,094 B1 | * | 4/2002 | Alstmar | 198/852 |
| 6,412,625 B1 | * | 7/2002 | Damkjaer | 198/834 |
| 6,439,378 B1 | | 8/2002 | MacLachlan | |
| 6,471,047 B1 | * | 10/2002 | Shibayama et al. | 198/844.1 |
| 6,474,464 B1 | * | 11/2002 | Horton et al. | 198/853 |
| 6,523,680 B1 | * | 2/2003 | Guldenfels | 198/853 |
| 6,725,883 B1 | * | 4/2004 | Guldenfels | 198/850 |
| 2001/0025771 A1 | | 10/2001 | Stebnicki et al. | |

FOREIGN PATENT DOCUMENTS

DE    3939083 A1 *    5/1991

* cited by examiner

*Primary Examiner*—Gene O. Crawford
*Assistant Examiner*—Leslie August Nicholson, III
(74) *Attorney, Agent, or Firm*—Hodgson Russ LLP; David L. Principe, Esq.

(57) ABSTRACT

A modular conveyor belt formed of rows of belt modules pivotally interlinked by transverse pivot rods. The modules include a top, product conveying surface and a bottom, sprocket-driven surface. The belt modules have a plurality of first link ends disposed in the direction of travel of the conveyor belt and a plurality of second link ends disposed in the opposite direction. Transverse holes in the link ends are aligned to accommodate a pivot rod. When the link ends of the consecutive rows of side by side modules are intercalated, the pivot rod serves as a hinge pin in a hinged joint between consecutive interlinked rows. The transverse holes are disposed at an angle relative to the top surface of the belt module such that when the belt modules are connected to form a belt the transverse holes in adjacent link ends are disposed at opposite angles.

15 Claims, 5 Drawing Sheets

BELT MODULE WITH OBLONG PIVOT HOLE

FIELD OF INVENTION

This invention relates to conveyor belts and, more particularly, to modular plastic conveyor belts formed of rows of plastic belt modules pivotally interlinked by transverse pivot rods.

BACKGROUND OF THE INVENTION

Because they are lightweight, do not corrode, and are easy to clean, unlike metal conveyor belts, plastic conveyor belts are used widely, especially in conveying food products. Modular plastic conveyor belts are made up of molded plastic modular links, or belt modules, that can be arranged side by side in rows of selectable width. A series of spaced apart link ends extending from each side of the modules include aligned apertures or holes to accommodate a pivot rod. The link ends along one end of a row of modules are interconnected with the link ends of an adjacent row. A pivot rod journaled in the aligned apertures of the side-by-side and end-to-end connected modules forms a hinge between adjacent rows. Rows of belt modules are connected together to form an endless conveyor belt capable of articulating about a drive sprocket.

In order to avoid having parts of the goods that are to be conveyed, such as food particles, from entering into the apertures or holes in the link ends and contacting the pivot rods, which can cause unsanitary conditions, modular flat top conveying belts are typically designed such that when they are rectilinear, they form a totally continuous, planar conveying surface. Typically, the link ends are narrow and in an assembled conveyor belt, the interconnected link ends completely enclose the pivot rods where they pass through the link ends. Having large portions of the pivot rods fully enclosed at all times by the link ends prevents thorough cleaning of both the pivot rods and their apertures or holes, unless the conveying belt is dismantled.

A conveyor belt constructed of modules designed such that the pivot rods and the link end apertures or holes can be cleaned without dismantling the belt is disclosed in U.S. Pat. No. 6,305,530 assigned to Habasit AG, which is the assignee of the present invention, and is incorporated herein by reference.

While the belt module shown in the '530 patent leaves open space on the side of the rod to allow access for cleaning fluid, the design reduces the link thickness above the oblong hole. This reduction in thickness may weaken the link and therefore limit the length of the oblong hole that is possible. Accordingly, there is a need for a design that provides open space on the side of the rod but does not significantly weaken the link.

SUMMARY OF THE INVENTION

The present invention meets the above-described need by providing an endless conveyor belt formed of plastic belt modules having pivot holes in their link ends that are disposed at an angle relative to the plane defined by the top surface of the belt module. In comparison with a completely round hole, the shape of the angled, oblong pivot holes do not reduce the thickness of the module between the pivot holes and the top surface of the module. Therefore the pivot holes of the present invention do not significantly weaken the module and can be extended lengthwise to provide a larger opening for cleaning.

The modules include first and second module surfaces, i.e., a top, product-conveying surface and a bottom, sprocket-driven surface. An intermediate section extends between the first and second module surfaces and across each module transverse to the direction of belt travel. The intermediate section supports a first plurality of link ends at one end and supports a second plurality of link ends at the opposite end. Elongate transverse holes are disposed in the link ends and are aligned to accommodate a pivot rod. When the link ends of consecutive rows of side-by-side modules are intercalated, the pivot rod serves as a hinge pin in a hinged joint between consecutive interlinked rows.

The belt is driven by engagement of the teeth on a sprocket as known to those of ordinary skill in the art to which the invention pertains.

In an assembled conveyor belt, adjacent belt modules align with each other such that the transverse holes in the adjacent link ends are angled in opposite directions. As a result, the pivot rod is captured by the respective holes in an overlapping area so that the pivot rod is confined to a portion of each of the elongate holes and is not free to move along the entire length of either of the holes. The cooperation of the adjacent angled holes prevents translatory motion of the pivot rod, and provides access to the transverse hole and to the pivot rod for cleaning. Accordingly, the present design provides for greater access to the inside of the transverse holes and to the pivot rods for better cleaning and easier maintenance. The enhancement is provided without introducing any undesirable translatory motion or "play" in the belt.

BRIEF DESCRIPTION OF THE DRAWINGS

The invention is illustrated in the drawings in which like reference characters designate the same or similar parts throughout the figures of which.

DETAILED DESCRIPTION OF THE PREFERRED EMBODIMENTS

Figure 1:
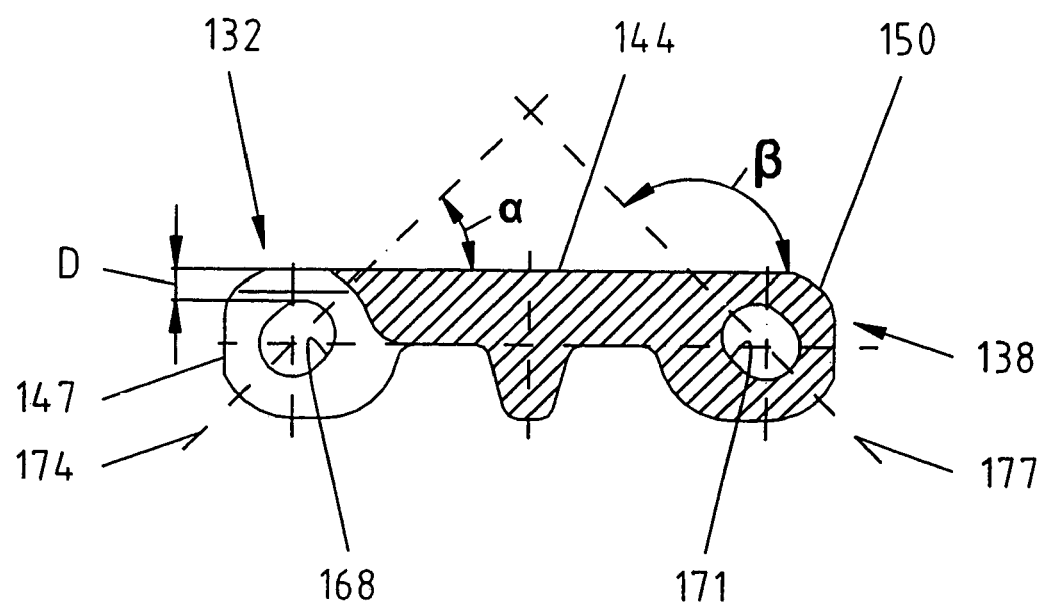
FIG. 1 is a side elevational view of a prior art belt module.

In FIG. 1, a prior art module is shown, the curved portion 147 of the link end 132 is shown at one end of the figure and at the opposite end of the figure the curved surface 150 at the end of the second link end 138 is shown. Also, first and second elongate transverse holes 168, 171 are shown. The transverse holes 168, 171 have longitudinal axes 174 and 177 respectively. The transverse holes 168, 171 are preferably elongate and oval-shaped. The transverse hole 168 is angled at an angle α which is 10° to 80° relative to the horizontal axis defined by top surface 144. The preferred embodiment provides for an angle α of approximately 45°. The transverse hole 171 on the opposite end of the module is rotated by approximately 90° such that it is disposed at an angle β approximately 100° to 170° to the top surface 144. The preferred embodiment for the second hole 171 is an angle β of approximately 135°. As shown, the shape of holes 168 and 171 being elongate and extending at a 45° angle with respect to the top surface 144 results in a reduction in the distance D between the top of hole 168 and top surface 144. This reduction may weaken the module as discussed above.

Figure 3:
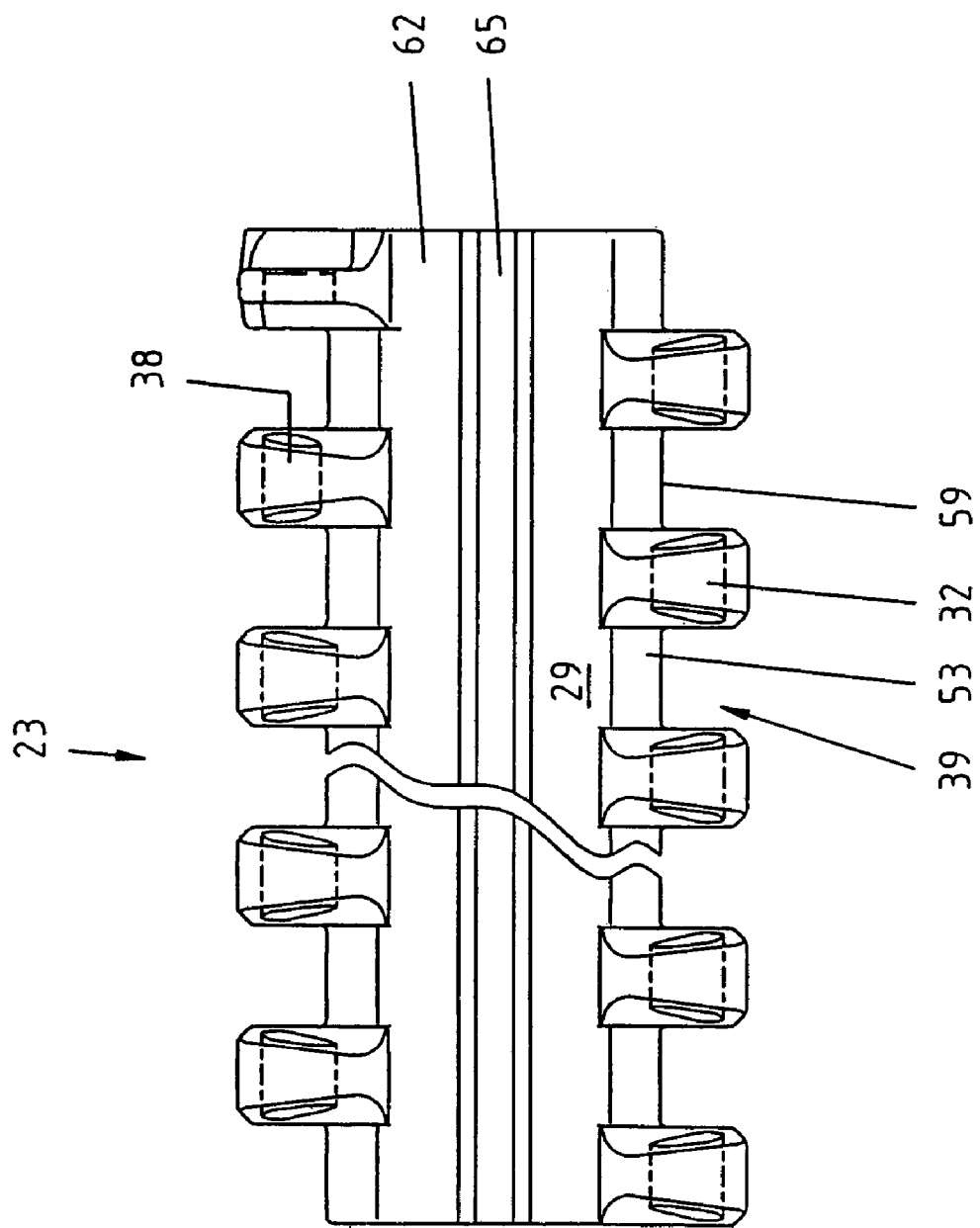
FIG. 3 is a bottom plan view of the belt module of FIG. 2.
Figure 4:
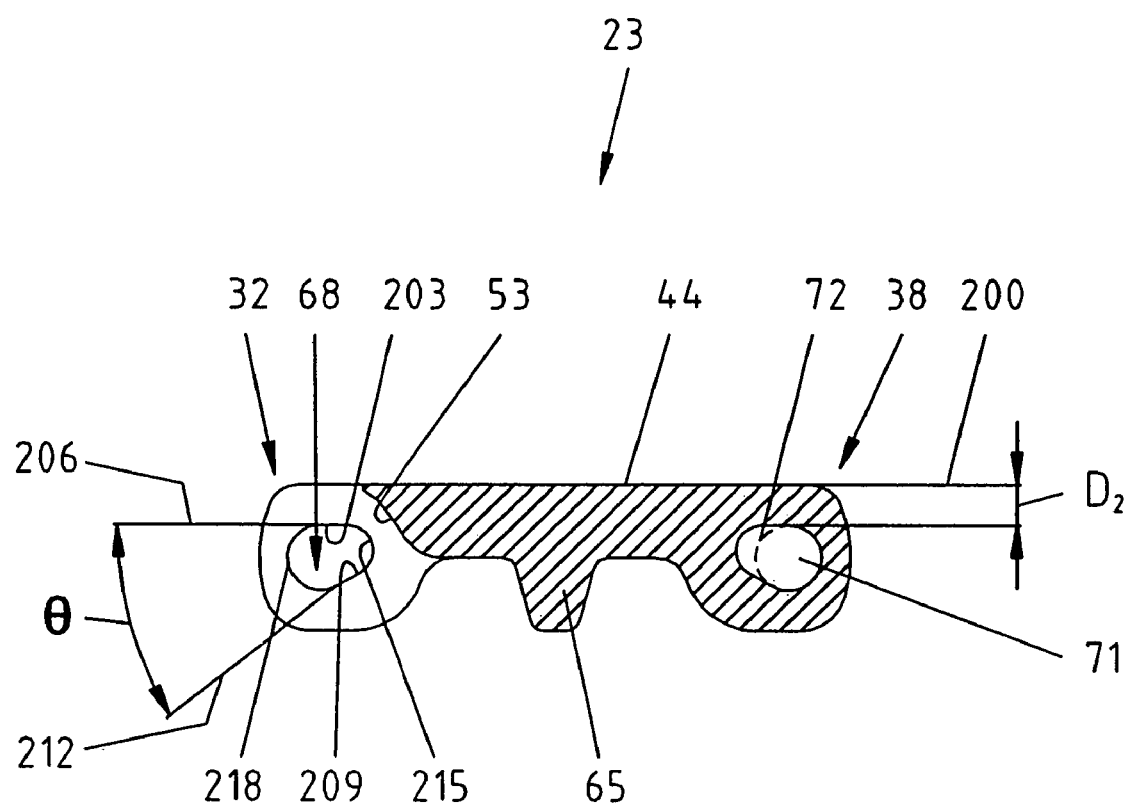
FIG. 4 is a side elevational view of a belt module according to the present invention; and, FIG. 5 is a side elevational view of the belt of the present invention showing two belt modules with link ends intercalated.
Figure 5:
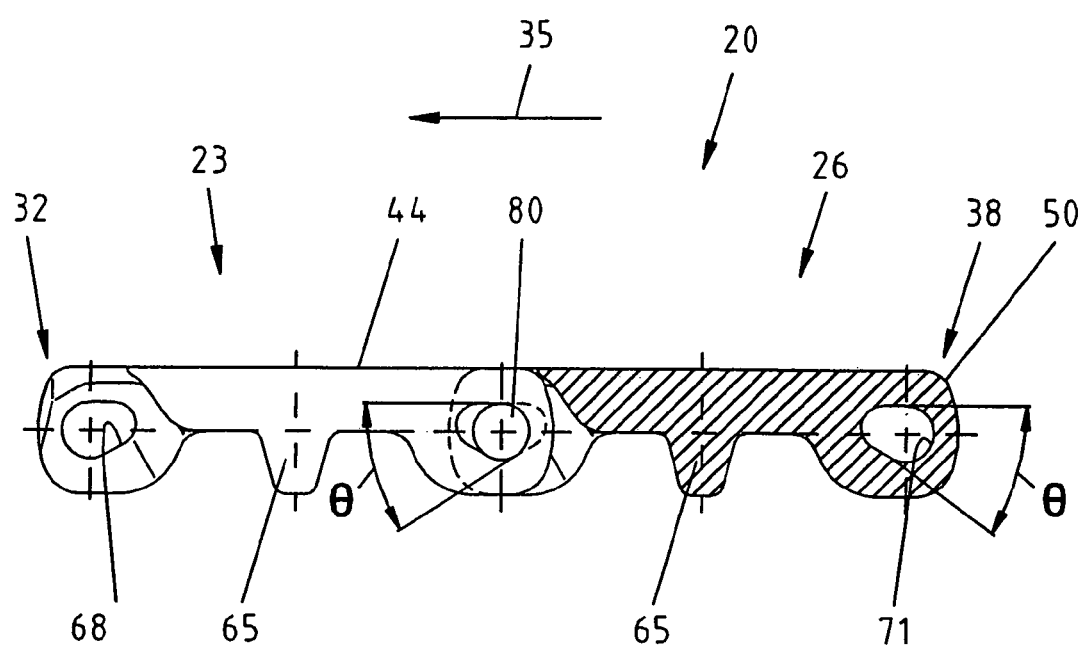

Referring to FIGS. 2 to 5 generally and initially to FIG. 5, the flat top modular belt 20 of the present invention is formed from interconnected belt modules 23 and 26. Although the belt 20 is shown with two modules 23, 26, the belt 20 may include several modules in order to provide belts 20 having different widths. Also, each module does not have to be the same width, and the belt can be formed by arranging the modules 23, 26 in "bricklayed" fashion as will be evident to those of ordinary skill in the art.

Figure 2:
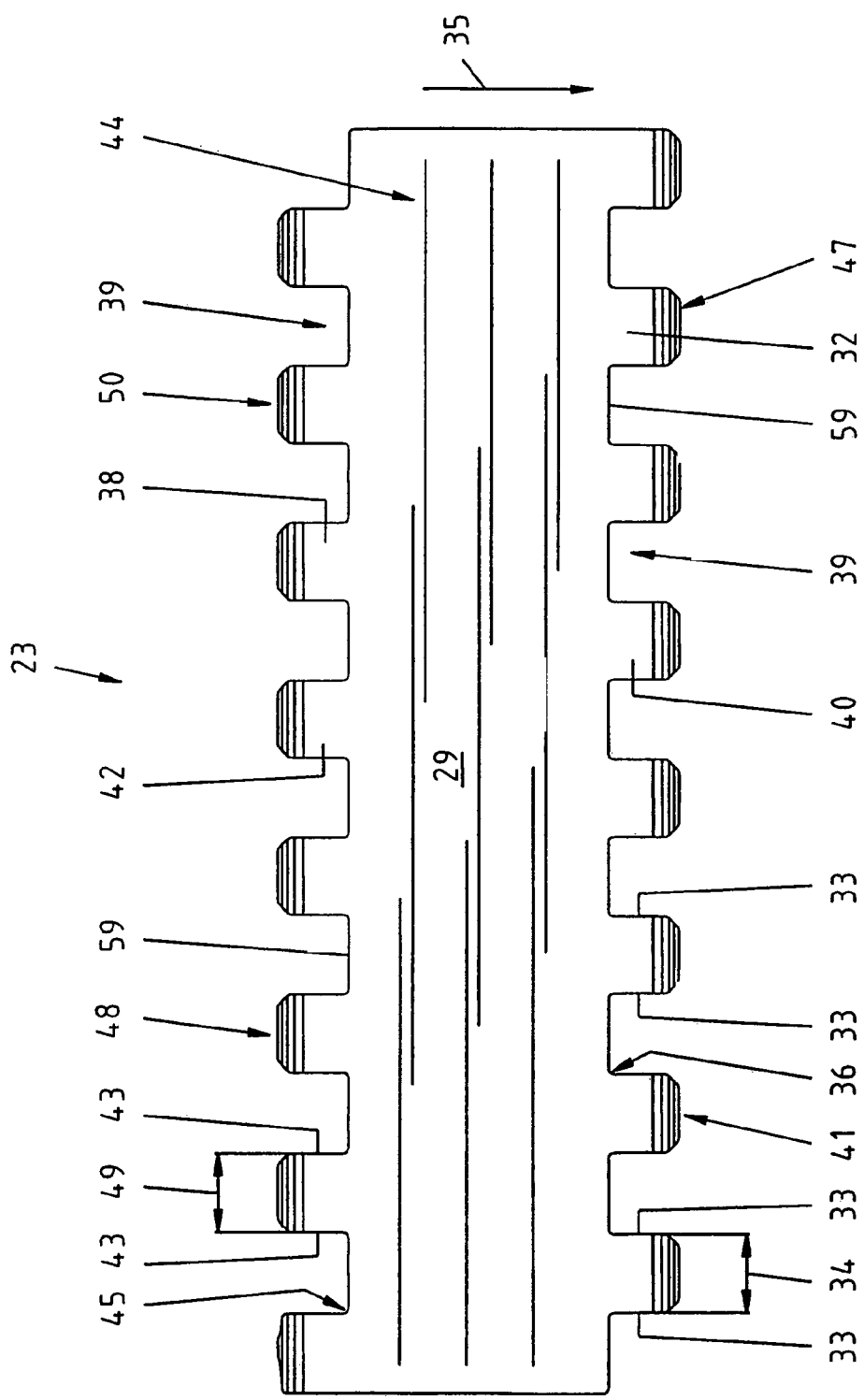
FIG. 2 is a top plan view of the belt module of the present invention.

Referring to FIG. 2, belt module 23 is preferably formed out of plastic or other material suitable for food handling which is lightweight, does not corrode, and may be easily cleaned. The belt module 23 is preferably thermoformed out of a plastic resin raw material as known to those of ordinary skill in the art. The module 23 has an intermediate section 29 that supports a first set of link ends 32 disposed in the direction of belt travel indicated by arrow 35. The direction of belt travel is provided for reference only as the belt 20 of the present invention may be driven in either direction. The link ends 32 have opposed side walls 33 providing a first transverse thickness 34. The transverse thickness 34 is connected to the intermediate section 29 at a proximal portion 36 and extends from the intermediate section 29 in a direction of belt travel to a first distal portion 41.

The intermediate section 29 also supports a second set of link ends 38 that are disposed in the opposite direction from the first set of link ends 32. The second link ends 38 also have opposed walls 43 defining a transverse thickness 49 and extending from a proximal portion 45 to a distal portion 48. The spaces 39 between successive link ends 32, 38 are sized so as to accept a link end 32, 38 from an adjacent belt module (best shown in FIG. 5). The intermediate section 29 and portions 40, 42 of the link ends 32, 38, respectively, are coplanar along the top surface 44 such that the top surface 44 is substantially flat when adjacent modules 23, 26 are connected. The ends 47, 50 of the link ends 32, 38 are curved to fit into the curved section 53 (best shown in FIG. 4) formed along portions of the edge 59 of the intermediate section 29. Accordingly, when the belt 20 is assembled with pivot rods as described hereafter, the top surface 44 is substantially flat and the gaps, which are located between modules and where food parts can enter the belt 20, are minimized.

As shown in FIG. 3, the bottom surface 62 of the belt module 23 has a stiffening web 65 disposed along the center of the module 23. The stiffening web 65 provides structural rigidity to the module 23 and also may be used for a contact point for the sprocket (not shown) that drives the belt 20 from below. As known to those of ordinary skill in the art, a drive sprocket may engage the link ends 32, 38 or the web 65 to drive the belt 20 from below. The modules 23, 26 are connected end to end as shown in FIG. 5 and are combined with other modules to form an endless belt that is driven and guided by drive sprockets and idler sprockets (not shown) as known to those of ordinary skill in the art.

As shown in FIG. 3, the curved portion 53 of the intermediate section 29 is disposed adjacent to the spaces 39 between the link ends 32, 38 to accept the curved portions 47, 50 of the link ends 32, 38.

Turning to FIG. 4, a module 23 has a top surface 44 disposed along an axis 200. Link ends 32, 38 extend in opposite directions with respect to axis 200. Stiffening web 65 extends downward relative to the top surface 44 and is disposed along a central longitudinal axis of the module 23 disposed normal to the page.

Link end 32 is provided with a pivot hole 68 capable of receiving pivot rod 80 as shown in FIG. 5. The pivot hole 68 has an upper wall 203 disposed along an axis 206. Upper wall 203 is substantially straight and is disposed substantially parallel to the top surface 44. The pivot hole 68 also has a substantially straight wall 209 that is disposed along axis 212 which is disposed at an angle θ with respect to upper wall 203. The angle θ is acute and in the example shown is approximately thirty degrees. Walls 203 and 209 are connected at opposite ends by curved portions 215 and 218. Curved portion 215 is shorter in length than curved portion 218 because of the angle between the two walls 203 and 209. Accordingly, because of the angle between the walls, pivot hole 68 has an overall shape that resembles a cone. The distance $D_2$ between the upper wall 203 and the top surface 44 is the same as for a standard module having a fully round pivot hole.

The pivot holes 68, 71 have a rod receiving portion 72 indicated by broken lines in the figures. The rod receiving portion is disposed adjacent to curved wall 218. From the rod receiving portion 72 to the opposite end where curved wall 215 is located the holes 68, 71 become narrower such that the pivot rod 80 is not capable of translatory motion when adjacent modules are intercalated.

With reference to the right hand side of FIG. 4, pivot hole 71 is a mirror image of pivot hole 68. When the modules 23 and 26 are intercalated as shown in FIG. 5, the holes 68 and 71 from adjacent modules overlap to form a substantially round portion that receives the pivot rod 80. The remaining portions of the pivot holes 68 and 71 provide access to the pivot rod 80 for cleaning.

Referring to FIG. 5, when the modules 23, 26 are intercalated, the pivot rod 80 is captured in the area of overlap of the adjacent holes 68, 71 and is not allowed to travel along the length of the elongated holes 68, 71. In this manner and even though the angled holes 68, 71 are elongate, the link ends 32, 38 are fixed relative to each other and are not capable of translatory movement relative to each other. The link ends 32, 38 are only capable of rotating about the pivot rod 80 relative to each other. Accordingly, there is a very small, if any, amount of "play" in the direction of belt travel 35 or the opposite direction, and the modules 23, 26 cannot make translatory motion relative to one another.

Accordingly, because the angled transverse holes 68, 71 are oversized and elongate relative to the pivot rod 80, there is much greater access to the transverse holes 68, 71 and to the pivot rod 80 in comparison to conventional transverse holes. Accordingly, the belt 20 of the present invention is easier to clean without disassembling the belt. The link ends 32, 38 provide a gap, leaving the pivot rod 80 exposed from the bottom side of the module, whereas it remains totally closed from the top side. During cleaning operation pressurized cleaning fluid such as water spray may easily enter the gap from the bottom of the module and reach the exposed pivot rod 80 through the enlarged holes 68, 71. Further, the transverse holes 68, 71 allow the fluid to enter from the side of the link and get access to the pivot rod also inside of the holes 68, 71.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A belt module comprising:
(a) an intermediate section having a top surface;
(b) a first plurality of link ends, each having opposed side walls providing the first link ends with a first transverse thickness connected to the intermediate section at a first proximal portion and extending from the intermediate section in a direction of belt travel to a first distal portion, wherein the first link ends each have a first pivot hole through the thickness between and to the opposed side walls, the first pivot hole being formed from a first wall disposed substantially parallel to the top surface and a second wall disposed at a first acute angle to the first wall, the first and second walls being connected to each other by first and second curved walls disposed at opposite ends of the first pivot hole;
(c) a second plurality of link ends, each having opposed side walls providing the second link ends with a second transverse thickness connected to the intermediate section at a second proximal portion and extending from the intermediate section in a direction opposite to the first link ends to a second distal portion, wherein the second link ends each have a second pivot hole through the thickness between and to the opposed side walls, the second pivot hole being formed from a third wall disposed substantially parallel to the top surface and a fourth wall disposed at a second acute angle to the third wall, the third and fourth walls being connected to each other by third and fourth curved walls disposed at opposite ends of the second pivot hole, the first and second acute angles being reflective, and wherein the second link ends are offset from the first link ends such that adjacently positioned belt modules are capable of being intercalated so that the first link ends of one belt module fit into spaces defined between the second link ends of an adjacent belt module; and,
(d) wherein the first pivot hole has a rod receiving portion disposed adjacent to the second curved wall, the first pivot hole becoming narrower from the rod receiving portion in a direction away from the rod receiving portion toward the first curved wall which borders a remaining portion, the rod receiving portion disposed in communication with the remaining portion to provide access to the pivot rod; and wherein the second pivot hole has a rod receiving portion disposed adjacent to the fourth curved wall, the second pivot hole becoming narrower from the rod receiving portion in a direction away from the rod receiving portion toward the third curved wall which borders a remaining portion, the rod receiving portion disposed in communication with the remaining portion to provide access to the pivot rod;
wherein when one of the first plurality of link ends is intercalated with one of the second plurality of link ends on an adjacent module to form a belt, the rod receiving portions of the first and second pivot holes are capable of being aligned in a direction transverse to belt travel while the remaining portions of the first and second pivot holes are not aligned transverse to belt travel when adjacent modules form a flat conveying surface.

2. The belt module of claim 1, wherein the intermediate section has a stiffening web disposed thereon.

3. The belt module of claim 2, wherein the stiffening web is disposed on a side of the belt module opposite from the top surface.

4. The belt module of claim 1, wherein the first and second acute angles are approximately thirty degrees.

5. The belt module of claim 1, wherein the first and second pivot holes are disposed at acute angles with respect to the top surface.

6. The belt module of claim 1, wherein the first and second pivot holes have an overall shape resembling a cone.

7. The belt module of claim 1, wherein the first and second pivot holes overlap such that a substantially round portion of each pivot hole is placed in registry when adjacent modules are intercalated.

8. A modular belt, comprising:
(a) a plurality of belt modules, each having an intermediate section having a top surface, a first plurality of link ends, each having opposed side walls providing the first link ends with a first transverse thickness connected to the intermediate section at a first proximal portion and extending from the intermediate section in a direction of belt travel to a first distal portion, wherein the first link ends each have a first pivot hole through the thickness between and to the opposed side walls, the first pivot hole being formed from a first wall disposed substantially parallel to the top surface and a second wall disposed at an acute angle to the first wall, the first and second walls being connected to each other at opposite ends by first and second curved walls; and a second plurality of link ends, each having opposed side walls providing the second link ends with a second transverse thickness connected to the intermediate section at a second proximal portion and extending from the intermediate section in a direction opposite to the first link ends to a second distal portion, wherein the second link ends each have a second pivot hole through the thickness between and to the opposed side walls, the second pivot hole being formed from a third wall disposed substantially parallel to the top surface and a fourth wall disposed at a second acute angle to the third wall, the third and fourth walls being connected to each other at opposed ends by third and fourth curved walls, the first and second acute angles being reflective, and wherein the second link ends are offset from the first link ends such that adjacently positioned belt modules are capable of being intercalated so that the first link ends of one belt module fit into spaces defined between the second link ends of an adjacent belt module; and, wherein the first pivot hole has a rod receiving portion disposed adjacent to the second curved wall, the first pivot hole becoming narrower from the rod receiving portion in a direction away from the rod receiving portion toward the first curved wall which borders a remaining portion, the rod receiving portion disposed in communication with the remaining portion to provide access to the pivot rod; and wherein the second pivot hole has a rod receiving portion disposed adjacent to the fourth curved wall, the second pivot hole becoming narrower from the rod receiving portion in a direction away from the rod receiving portion toward the third curved wall which borders a remaining portion, the rod receiving portion disposed in communication with the remaining portion to provide access to the pivot rod;
wherein when one of the first plurality of link ends is intercalated with one of the second plurality of link ends to form a belt the rod receiving portions of the first and second pivot holes are capable of being aligned in a direction transverse to belt travel while the remaining portions of the first and second pivot holes are not aligned transverse to belt travel; and when adjacent modules form a flat conveying surface, (b) a pivot rod disposed through the first and second pivot holes in the first and second link ends of adjacent belt modules.

9. The belt module of claim 8, wherein the intermediate section has a stiffening web disposed thereon.

10. The belt module of claim 9, wherein the stiffening web is disposed on a side of the belt module opposite from the top surface.

11. The belt module of claim 8, wherein the first and second acute angles are approximately thirty degrees.

12. The belt module of claim 8, wherein the first and second pivot holes are elongated.

13. The belt module of claim 9, wherein the first and second pivot holes are disposed at acute angles with respect to the top surface.

14. The belt module of claim 8, wherein the first and second pivot holes have an overall shape resembling a cone.

15. The belt module of claim 8, wherein the first and second pivot holes overlap such that a substantially round portion of each pivot hole is placed in registry when adjacent modules are intercalated.

* * * * *